United States Patent Office

3,442,764
Patented May 6, 1969

3,442,764
PROCESS OF PURIFYING BROMELAIN
Harland H. Young, Western Springs, William D. Warner, La Grange Park, and John K. McAnelly, Park Forest, Ill., assignors to Swift & Company, Chicago, Ill., a corporation of Illinois
No Drawing. Filed Sept. 12, 1966, Ser. No. 578,465
Int. Cl. C12d; A22c
U.S. Cl. 195—66                    7 Claims

ABSTRACT OF THE DISCLOSURE

Solutions containing bromelain are purified by adjusting the pH to 3–6, treating with magnesium oxide or magnesium hydroxide to adjust the pH to 8–10 whereby a flocculant is formed which can be readily filtered by adding a filtering aid.

---

This invention relates to a new and improved method for the purification of plant derived proteolytic enzyme solutions. More particularly, it relates to a method of clarifying bromelain solutions by filtration, said solutions being suitable after further processing for ante-mortem tenderization treatment of animals.

Enzymes and other proteinaceous materials frequently are found associated with a number of other natural materials which must be removed prior to the use of the desired proteinaceous substances. The contaminants comprise a wide range of materials. Some of the contaminants, such as sand, grit, dirt and clay, may be readily removed by sedimentation. But, other contaminants, such as fats, carbohydrates, mucins, gums, mucilages, phospholipids, steroids and glycosides, which are colloidal in nature, cannot be so readily removed. Such colloids not only defy filtration, but further suspend particles and dirt so that these too are not easily separated from the desired proteinaceous material. This problem does not occur as to all protein solutions, since many can be clarified by means of filtration with filter aids to the required clarity. Other proteinaceous materials, notably the plant derived proteolytic enzyme bromelain, when in solution, contain quantities of these colloidal impurities which cause rapid blocking of filters irrespective of the many filter aids used.

When a bromelain solution containing such impurities is utilized, undesirable results may be obtained. For example, when solutions of bromelain are used for ante-mortem injection of animals as per the process in U.S. Patent No. 2,903,362, issued Sept. 8, 1959, the enzyme solution must have crystal clarity. If the impurities are not removed, they contribute to undesirable physiological reactions when the enzyme solution is injected. Since heat or other bactericidal agents cannot be tolerated without harm to the activity of the enzyme, or to the animal into which the enzyme solution is injected, it is imperative to purify these solutions containing colloidal impurities without adversely affecting the enzyme or the animal when the enzyme is injected into the animal.

One such purification procedure entails filtering the bromelain solution through a bacterial filter, such as a Seitz filter, and then selectively inactivating any residual impurities. However, for such filtration to be possible, the solution must preliminarily be clarified to a high degree since even colloidal impurities will clog the extremely fine bacterial filter. Therefore, it is important to provide a method which will sufficiently purify the solution so that it can subsequently be filtered through a bacterial filter. Furthermore, it is apparent that since such a purification procedure as described above encompasses two filtration steps, it is of great economic importance to provide a method wherein the filtration time is minimized. Also, as noted above, for the procedure to be of value, it is essential for the purification technique not to adversely affect the proteolytic potency of the enzyme itself. By the term proteolytic potency of the enzyme as employed herein is meant the capacity of the enzyme to catalyze the hydrolysis of a protein.

It is therefore an object of this invention to provide a new method for the purification of plant derived proteolytic enzyme solutions which is more efficient and economical than methods now known to the art.

Another object of the present invention is to provide a new and improved method for the purification of bromelain solutions by means of filtration, said filtration being more rapid than has been possible by methods known heretofore and which provides a purified solution without adversely affecting the proteolytic potency of the enzyme.

A further object of the present invention is to provide a new method for the purification of bromelain solutions which can be utilized in the preparation of enzyme solutions for ante-mortem injection of animals.

It is a still further object of the present invention to provide a method for purifying bromelain solutions, without destroying the proteolytic potency of the enzyme, said solutions having sufficient purity to allow filtration through a bacterial filter, such as a Seitz filter, without clogging the filter.

Additional objects, if not specifically set forth herein, will be readily apparent to those skilled in the art from the detailed description of the invention which follows.

Generally, the present invention comprises treating an impure bromelain solution, which has previously been adjusted to a pH range of from about 3 to about 6, with magnesium oxide, magnesium hydroxide, or mixtures thereof and agitating the mixture to promote the dissolving of the magnesium compound. The pH of the solution is thereby adjusted to a range of about 8 to about 10. Within this pH range, the impurities flocculate and they can be filtered off, leaving the purified enzyme solution as the filtrate.

This filtered enzyme solution has been found to have a higher degree of clarity and purity than solutions obtained by methods previously known to the art, and to be sufficiently clear and pure to be further filtered through a bacterial filter, such as a Seitz filter, without clogging the filter, in the preparation of the enzyme for ante-mortem injection into food animals. In addition to the higher degree of purification which this method affords, it has also been discovered that the filtration time is substantially reduced as compared with other methods previously known to the art.

More specifically, the method of this invention comprises initially adjusting the pH of a bromelain solution, containing colloidally suspended contaminants, to a range of from about 3 to about 6 with a more preferred range of from about 3.5 to about 5.5. This adjustment of the pH of the impure enzyme solution to below about 6 is performed because it has been found that if the magnesium compound is added to the solution at a pH above about 6, the filtration rate will be adversely affected. The pH of the impure bromelain solution is not adjusted below about 3 because under such acid conditions the bromelain will not be stable. The adjustment of the pH of the solution to the range of from about 3 and about 6 can be made with any convenient food grade acid. Exemplary of acids which may be utilized to adjust the pH of the enzyme solution are hydrochloric acid, acetic acid, lactic acid, malic acid, citric acid, and the like.

After the adjustment of the pH of the solution to the range of from about 3 to about 6, magnesium oxide, magnesium hydroxide or a mixture thereof, is then added to the solution in a quantity greater than the solubility saturation level of the magnesium compound and also in an amount sufficient to rapidly raise the pH of the solution to a range of from about 8 to about 10, with a more preferred range of from about 8.2 to about 9.5. A flocculant containing the undesirable contaminants, including the impurities which were colloidally suspended in the original solution, is thus formed. This flocculant can readily be separated from the desired enzyme solution by adding a filter aid such as diatomaceous earth, alumina, activated charcoal, talc, china clay, regular leaching clay, or activated leaching clay; and, filtering off the impurities by any commonly known filtering procedure, and recovering the purified enzyme solution as the filtrate.

It is to be understood that there is an importance attached to the pH levels disclosed above and throughout this disclosure; however, one skilled in the art will understand that the bromelain materials utilized herein are not pure, but are systems including other naturally occurring and sometimes added compounds, which display some, and often significant, variations and sensitivity to pH. Accordingly, the precise pH values disclosed herein should be construed as being subject to some variation consonant with the purity and the particular composition of the enzyme system utilized.

It has been found that some filter aid is necessary to enhance the activity of the magnesium oxide, magnesium hydroxide, and mixtures thereof, and thus maximize the efficiency of the process. Therefore, a filter aid should be added to the enzyme solution before filtration. The amount of filter aid to be added may vary to a great extent, although excessive amounts should be avoided since large amounts of the filter aid will tend to clog the filter and thus adversely affect the filtration rate. However, to achieve optimum filtration times, it has been found to be most desirable to use between about 0.25% (w./v.) and about 2.5% (w./v.) filter aid, particularly diatomaceous earth.

The amount of magnesium compound to be employed in the process of the present invention is variable. The amount must be sufficient to raise the pH of the solution, which has previously been adjusted to between about 3 to about 6, to above about 8 within about one hour in order to prevent the destruction of the proteolytic potency of the enzyme. Within the pH range of from about 5.5 to about 8.2, the enzyme is unstable, and if allowed to remain in this range for greater than about one hour, the proteolytic potency of the enzyme would be destroyed. However, the amount of magnesium compound added should not be so great as to cause the pH of the solution to rise above about 8 too quickly since the momentum created by too rapid a rise in the pH may cause the pH to carry up above about 10 at which level the enzyme begins to lose its proteolytic potency. This is true even though the filtration step removes any undissolved magnesium compound present and, therefore, tends to stop the pH rise. Thus, it has been found that it is most preferred to utilize an amount of magnesium oxide, magnesium hydroxide, or mixtures thereof, which will raise the pH to above about 8 in a period of time not less than about 15 minutes nor greater than about one hour. Furthermore, it has been found that this result can suitably be achieved by the addition of an amount of magnesium oxide, magnesium hydroxide or mixtures thereof in the range of from about 0.2% (w./v.) to about 1.4% (w./v.).

Another important factor in preserving the proteolytic potency of the enzyme while purifying the enzyme solution is the temperature of the solution. It has been found that when the temperature of the solution is above about 30° C. the proteolytic potency of the enzyme begins to be destroyed since the enzyme will begin to digest itself. Also, at temperatures above about 30° C. there is a danger of bacterial growth in the solution which might cause clogging of the filter and thus adversely affect the filtration rate. Consequently, the temperature of the solution should be below about 30° C. and in a preferred embodiment of this invention the temperature of the solution should be in a range of from about 15° C. to about 25° C.

The following examples are given as illustrative of the present process and the results derived therefrom. The examples should be considered as illustrative only, and not in any way limiting the scope of the present invention.

EXAMPLE I

Six 500 ml. 4% bromelain solutions were prepared by making 6 separate slurries, each containing 20 grams of bromelain and 20 grams of C.P. glycerin and then diluting each slurry up to 500 ml. with cold (15° C.) distilled water. One 500 ml. sample was left at its natural pH as a control. Each of the other samples was adjusted to a more acidic pH by the addition of 6 N hydrochloric acid. Then, each of the six solutions was treated with 0.8% (w./v.) magnesium oxide and the solutions were stirred until the pH reached 8.0 at which time agitation was stopped and 1% (w./v.) diatomaceous earth (Hy-Flo Super Cel) was added to each of the solutions. The solutions were filtered by vacuum filtration in a Buchner funnel through No. 617 filter paper. The vacuum in the flask was maintained at 27 inches of vacuum. The filtration time was measured when the instant liquid first appeared at the exit of the funnel until the liquid stopped flowing and foam appeared. The pH of the solution had continued to rise during the filtration to a final level of 9.5 for each of the filtered solutions. The filtration time for each of the samples was recorded in the following table:

| Adjusted pH of solution prior to MgO addition | pH after filtration | Filtration time (min.) |
| --- | --- | --- |
| 5.8 (natural pH) | 9.5 | 8 |
| 5.4 | 9.5 | 6 |
| 5.2 | 9.5 | 5 |
| 5.0 | 9.5 | 4 |
| 4.5 | 9.5 | 4 |
| 4.0 | 9.5 | 4 |

These results indicate that optimumly rapid filtration times are achieved when the pH of the bromelain solution is initially adjusted to a mode acidic pH range before treating the solution with magnesium oxide.

EXAMPLE II

Four 500 ml. 4% bromelain solutions were prepared by the procedure of Example I. All four samples were adjusted to an initial pH of 4.5 by the addition of 6 N hydrochloric acid. Then, two of the samples were adjusted to pH 9.5 with 5 N sodium hydroxide. The other two samples were treated with magnesium oxide (0.5% w./v.) and the solutions were stirred until the pH reached 8.5, at which time the agitation was stopped and the solutions were allowed to set in a refrigerator for about one hour. Then, a filter aid, diatomaceous earth, was added to each of the four solutions and the solutions were filtered by the procedure of Example I. The pH of the two solutions to which magnesium oxide had been added continued to rise during filtration to a final level of 9.5 after filtration. The filtration times for each of the samples were recorded. Then, each of the four solutions was adjusted to pH 9.0 with 6 N hydrochloric acid and the reduced milk clotting activity, which is proportional to the amount of proteolytic enzyme activity, of each of the four bromelain solutions was determined by the following procedure.

Reduced milk clotting test

A 10 ml. sample of each of the four filtered enzyme solutions was taken. Each sample was separately mixed with 10 ml. of an aqueous solution of 0.2 M cysteine-hydrochloride-0.01 M Versene previously adjusted to pH 6.0. Each of the four mixtures was allowed to stand for ten minutes and then diluted to 100 ml. with deionized water. After incubating at 40° C. for 5 minutes, the four enzyme preparations were ready for use.

A substrate was prepared by mixing 80 grams of low-temperature spray-dried skimmed milk powder and 290 ml. of deionized water containing 50 ml. of 0.1 M cysteine-hydrochloride-0.01 M Versene (previously adjusted to pH 6.0) and 6 ml. of 4.0 M calcium chloride. This substrate solution was also incubated at 40° C. for 30 minutes. 5 ml. of skimmed milk substrate was placed in each of four test tubes. Then, 1 ml. of one of the four enzyme solutions was separately added to each of these test tubes, followed by heating of each of the mixtures at 40° C. until the milk clotted. The time in seconds required for the clotting is proportional to the proteolytic enzyme activity as follows:

$$\frac{RMCU}{ml.} = \frac{60 \times D}{T}$$

RMCU = Reduced milk clot units
T = Clotting time in seconds
D = Dilution factor

The results are shown in the following table:

| Compound added | Percent diatomaceous earth | Initial adjusted pH | Final pH (after filtration) | Filtration time (min.) | RMCU |
|---|---|---|---|---|---|
| MgO (0.5% w./v.) | 0.5 | 4.5 | 9.5 | 15 | 82.5 |
| NaOH | 0.5 | 4.5 | 9.5 | >30 | 78.0 |
| MgO (0.5% w./v.) | 2.0 | 4.5 | 9.5 | 2 | 80.0 |
| NaOH | 2.0 | 4.5 | 9.5 | >30 | 76.4 |

This comparative data illustrates that the filtration time is substantially lessened by the method of the present invention as compared with the procedure generally utilized heretofore, i.e., treatment of the enzyme solution with sodium hydroxide. Furthermore, it is to be noted that the method of the present invention in no way adversely affects the proteolytic potency of the bromelain solution and, in fact, affords filtered solutions having a better proteolytic potency, as determined by the reduced milk clotting technique, than solutions purified by the generally recognized procedure heretofore employed.

EXAMPLE III

By the procedure of Example I, four 500 ml. 4% bromelain solutions were prepared. Each of the solutions was initially adjusted to a pH of 4.5 by the addition of 6 N hydrochloric acid. Then, one solution was treated with 0.7% (w./v.) magnesium oxide. The second solution was treated with 0.2% (w./v.) calcium oxide (0.2% calcium oxide was used instead of 0.7% because the pH rose too rapidly to above 10 when the greater amount was used). The third solution was treated with 0.7% (w./v.) strontium oxide. And the fourth sample was treated with 0.7% (w./v.) barium oxide. To each of these solutions, 1% diatomaceous earth (Hy-Flo Super Cel) was added, and the solutions were filtered by the procedure of Example I. The filtration times were recorded. Then, the pH of the magnesium oxide treated solution which had risen to 9.5 during filtration was adjusted to 9.0 with 6 N hydrochloric acid in order to correspond with the pH of the other three solutions and the reduced milk clotting activity of each of the purified bromelain solutions was determined by the procedure specified in Example II. The results are shown in the following table:

| Compound added and amount | Initial adjusted pH | Final pH (after filtration) | Volume filtered in 15 min. | RMCU |
|---|---|---|---|---|
| Magnesium oxide (0.7%) | 4.5 | 9.5 | ¹ 500 | 78.8 |
| Calcium oxide (0.2%) | 4.5 | 9.0 | 410 | 62.5 |
| Strontium oxide (0.7%) | 4.5 | 9.0 | 266 | 71.4 |
| Barium oxide (0.7%) | 4.5 | 9.0 | 197 | 66.7 |

¹ 3 min.

This comparative data illustrates the unexpected character of the present invention, inasmuch as the oxides of the other alkaline earth metals which would be expected to have very similar properties to magnesium oxide did not exhibit the greatly improved and rapid filtration rate of bromelain solutions which the magnesium oxide treated solutions did. Also, the proteolytic potency of the filtered magnesium oxide treated bromelain solution was found to be superior to the bromelain solutions treated with oxides of the other cations of the alkaline earth family as indicated by the RMCU values in the table.

EXAMPLE IV

By the procedure of Example I, four 500 ml. 4% bromelain solutions were prepared. Each of the solutions was initially adjusted to a pH of 4.5 by the addition of 6 N hydrochloric acid. Then, one solution was treated with 0.7% (w./v.) magnesium oxide. The second solution was treated with 2.0% (w./v.) magnesium hydroxide (2% magnesium hydroxide was used instead of 0.7% in order to achieve a final pH corresponding to that of the other solutions herein). The third solution was treated with 0.7% (w./v.) magnesium carbonate and then with sufficient 5 N sodium hydroxide to raise the pH to 9.0. The fourth solution was treated with 0.7% (w./v.) magnesium chloride and then with sufficient 5 N sodium hydroxide to raise the pH to 9.0. To each of these solutions, 1% diatomaceous earth (Hy-Flo Super Cel) was added, and the solutions were filtered by the procedure of Example I. The filtration times were recorded. Then, the pH of the magnesium oxide treated solution which had risen to 9.5 during filtration was adjusted to 9.0 with 6 N hydrochloric acid and the pH of the magnesium chloride treated solution which had dropped to 8.2 during filtration was also adjusted to 9.0 with 5 N sodium hydroxide. The milk clotting activity of each of the purified bromelain solutions was determined by the procedure specified in Example II. The results are shown in the following table:

| Compound added and amount | Initial adjusted pH | Final pH (after filtration) | Volume filtered in 15 min. | RMCU |
|---|---|---|---|---|
| Magnesium oxide (0.7%) | 4.5 | 9.5 | ¹ 500 | 78.8 |
| Magnesium hydroxide (2.0%) | 4.5 | 9.0 | ¹ 500 | 74.6 |
| Magnesium carbonate (0.7%) | 4.5 | 9.0 | 220 | 66.7 |
| Magnesium chloride (0.7%) | 4.5 | 8.2 | 170 | 75.2 |

¹ 3 min.

This comparative data further illustrates the unexpected character of the present invention, inasmuch as magnesium compounds having anions other than oxide or hydroxide do not exhibit the greatly improved and rapid filtration time of bromelain solutions magnesium oxide and magnesium hydroxide solutions did. Also, the filtered magnesium oxide and magnesium hydroxide treated bromelain solutions, which were filtered much more rapidly than the other magnesium compounds of this example, exhibited as good and better proteolytic potency than the magnesium compounds containing other anions as indicated by the RMCU values in the above table.

Obviously many modifications and variations of the invention as hereinbefore set forth may be made without departing from the spirit and scope thereof, and therefore only such limitations should be imposed as are indicated in the appended claims.

We claim:
1. A method for the purification of a bromelain containing enzyme solution which comprises initially adjusting the pH of the solution to a range of from about 3 to about 6 and then treating the solution with a compound selected from the group consisting of magnesium oxide, magnesium hydroxide, and mixtures thereof; adding a filter aid, filtering the solution, and recovering the purified enzyme solution as the filtrate.

2. The method of claim 1 wherein the compound selected from the group consisting of magnesium oxide, magnesium hydroxide, and mixtures thereof, is employed in a quantity greater than the solubility saturation level of the compound and in an amount sufficient to rapidly raise the pH of the solution from the range of from about 3 to about 6 to a range of from about 8 to about 10.

3. The method of claim 2 wherein the amount of magnesium compound employed is sufficient to raise the pH to a range of from about 8 to about 10 in a period of time greater than about 15 minutes and less than about one hour.

4. The method of claim 1 wherein the temperature of the enzyme solution is below about 30° C.

5. The method of claim 1 wherein the filter aid is selected from the group consisting of diatomaceous earth, alumina, activated charcoal, talc, china clay, regular leaching clay, activated leaching clay, and mixtures thereof.

6. The method of claim 1 wherein the filter aid is added in an amount in the range of from about 0.25% (w./v.) to about 2.5% (w./v.).

7. A method for the purification of bromelain solutions at a temperature below about 30° C. which comprises initially adjusting the pH of the solution to a range of from about 3.5 to about 5.5 and then treating the solution with a sufficient amount of a compound selected from the group consisting of magnesium oxide, magnesium hydroxide, and mixtures thereof, to adjust the pH of the solution to a range of from about 8 to about 10 in a period of time greater than 15 minutes and less than one hour; adding diatomaceous earth in an amount in the range of from about 0.25% (w./v.) to about 2.5% (w./v.), filtering the solution and recovering the purified enzyme solution as the filtrate.

References Cited

UNITED STATES PATENTS

| | | | |
|---|---|---|---|
| 3,002,891 | 10/1961 | Heinicke | 195—66 |
| 3,104,206 | 9/1963 | Messing | 195—66 |

LIONEL M. SHAPIRO, *Primary Examiner.*

U.S. Cl. X.R.

99—107